United States Patent Office 2,886,487
Patented May 12, 1959

2,886,487
QUATERNARY AMMONIUM SALT AND N-THIO-TRICHLOROMETHYL HYDANTOIN VAGINAL COMPOSITION

Alfred B. Kupferberg, Somerville, and Heron O. Singher, Warrenville, N.J., assignors to Ortho Pharmaceutical Corporation, a corporation of New Jersey No Drawing. Application August 22, 1955
Serial No. 529,898

11 Claims. (Cl. 167—58)

This invention relates to novel compositions of matter and more particularly to novel topical medicaments. In its more specific aspects, the invention is directed to novel topical medicaments especially useful for the control of infections of which the etiological agents are pathogenic fungi. The novel topical medicaments are effective for the control of mycotic vulvovaginitis, either localized or generalized cutaneous moniliasis, and are particularly effective in the control of localized cutaneous disease involving onychia, paronychia, or intertriginous surfaces.

Prior to this invention mycotic infections either of a localized or generalized nature have been most commonly treated by means of aqueous solutions or formulations in the nature of creams and jellies containing gentian violet as the active fungicidal agent. This method of treatment has the disadvantage that solutions or formulations containing gentian violet have a pronounced color and solutions and formulations easily spread and run so that the portions of the body so treated and adjacent thereto become deeply and persistently stained. Quaternary ammonium compounds have been used alone for the treatment of mycotic infections but their fungicidal activity has been found to vary markedly with the different types of organic cation radicals present, and in many cases to be of a low order of efficiency in the control of pathogenic fungi.

It has now been found that by combining a quaternary ammonium salt with certain organic substances having an >NSCCl$_3$ radical in which the nitrogen is linked to an acyl radical and particularly with an N-thiotrichloromethylimide of a dicarboxylic acid, an N-thiotrichloromethyloxazolidine-dione, or an N-methyltriotrichloromethyl hydantoin in aqueous solution, suspension, or in a therapeutic formulation, a composition is provided which is considerably more effective than a corresponding composition containing either constituent alone and possesses a fungicidal effectivity of a higher order than would be expected by assuming the effects of the two ingredients to be additive only. As will be shown hereafter, the improved results of the present discovery are significant to an unexpected degree.

The improvement resulting from the combinations of the present invention in formulations in the nature of gels, creams, lotions, suspensions, tablets and powders, has been demonstrated by clinical use to be highly effective in the control of localized moniliasis involving onychia, paronychia and intertriginous surfaces, as well as in the control of generalized moniliasis.

Any quaternary ammonium salt may be used in the compositions of this invention which is non-toxic and non-irritating. However, the types of such salts listed below and defined by means of the following structural formula are preferred:

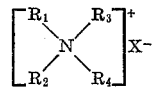

In the above formula, at least one of the radicals, $R_1$, $R_2$, $R_3$ and $R_4$ attached to the nitrogen atom is a hydrophobic alkyl, unsaturated alkyl, alicyclic, aryl, aralkyl, or alkaryl radical having at least six and preferably not more than eighteen carbon atoms. In all instances, the alkyl radical or alkyl part of the radical may be either straight or branched chain in nature. The remaining radicals on the nitrogen atom other than the hydrophobic radical may be substituents of hydrocarbon structure which contain a total of no more than about twelve carbon atoms. More specific examples of such quaternary ammonium salts include cetyl trimethyl ammonium chloride, octadecyl dimethyl ethyl ammonium bromide, octadecenyl dimethyl ammonium bromide, octyl dimethyl benzyl ammonium chloride, decyl dimethyl benzyl ammonium chloride, octadecyl dimethyl benzyl ammonium chloride, and BTC, an alkyl dimethyl benzyl ammonium chloride having an average molecular weight of 365 and in which the alkyl group comprises a mixture of alkyl radicals from $C_8H_{17}$—to $C_{18}H_{37}$—and principally $C_{12}H_{25}$—which is sold by the Onyx Oil and Chemical Company, Jersey City, N.J.

Other related quaternary ammonium salts which are also preferred are the long-chain alkylarylmethyl ammonium halides such as the long-chain alkyl dimethyl benzyl ammonium chlorides in general, including octadecyl dimethyl benzyl ammonium chloride, lauryl dimethyl benzyl ammonium chloride, octyl dimethyl benzyl ammonium chloride, decyl dimethyl benzyl ammonium chloride, and in particular, a mixture of high molecular aliphatic dimethyl benzyl ammonium chlorides in which the alkyl radical ranges from octyl to dodecyl, such as is contained in the corresponding fatty acids of coconut oil.

N-alkylmorpholineum and N-alkylpyridinium quaternary ammonium salts are also preferred, suitable specific examples of such compounds being, cetyl-beta-hydroxyethyl morpholineum chloride and N-cetylpiperidine methiodide.

The active component of the ammonium salt is the cationic portion, the salt-forming radicals being not generally regarded as critical. Any anionic radicals capable of yielding water-soluble salts and particularly halides, sulfates, phosphates, carbonate, formate, acetate, succinate, tartarate, and the like may be used, chloride and bromide radicals being preferred.

The N-thiotrichloromethyl imides of dicarboxylic acids used in the compositions of my invention are characterized by the formula:

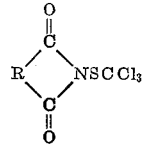

in which R is an organic residue. The organic residue may be aliphatic, aromatic or alicyclic, and substituted derivatives of such organic residues. Specific examples of the various N-thiotrichloromethyl imide compounds used in my novel compositions are N-thiotrichloromethyl phthalimide, N-thiotrichloromethyltetrahydrophthalimide, N-thiotrichloromethyl succinimide and N-thiotrichloromethylendomethylenetetrahydrophthalimide.

The N-thiotrichloromethyl oxazolidine-diones used in the compositions of our invention are characterized by the formula:

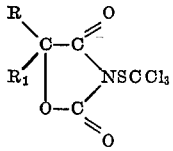

in which R and $R_1$ may each be hydrogen, an aryl or aliphatic radical having not more than eight carbon atoms, the aliphatic radical being a straight, branched-chain or cyclic radical, or R and $R_1$ may represent a cyclic configuration with the carbon of the oxazolidine ring being a member thereof.

Specific examples of various N-thiotrichloromethyl oxazolidine-diones used in our novel compositions are N - thiotrichloromethyl - 5,5 - dimethyl - oxazolidine - 2,4-dione, N - thiotrichloromethyl - 5-methyl-5-ethyl-oxazolidine-2,4-dione, N-thiotrichloromethyl-5-methyl-5-phenyl-oxazolidine-2,4-dione, N-thiotrichloromethyl-5-methyl-5-isobutyl - oxazolidine - 2,4 - dione, and N - thiotrichloromethyl-5-isooctyl-oxazolidine-2,4-dione.

The N-thiotrichloromethyl hydantoins used in the compositions of our invention are characterized by the formula:

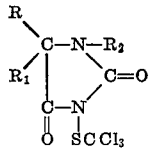

in which R and $R_1$ may each be hydrogen, or a straight, branched-chain or cyclic aliphatic radical having not more than eight carbon atoms; and in which $R_2$ may be hydrogen, an acyl radical having not more than six carbon atoms or a nitro radical.

Specific examples of various N-thiotrichloromethyl hydantoins used in our novel compositions are N-thiotrichloromethyl-5,5-dimethyl-hydantoin, 1-nitro - 3 - thiotrichloromethyl-5,5-dimethylhydantoin, 1 - acetyl - 3-thiotrichloromethyl-5,5-dimethylhydantoin and 3-thiotrichloromethyl-5-methyl-5-isobutylhydantoin.

The following examples are given to illustrate the invention and include the test results obtained showing the activity of the ingredients alone and in combination and in particular show the synergism resulting from the combination of a quaternary ammonium salt and an organic substance having an N-thiotrichloromethyl radical.

*Example I*

The order of fungicidal activity of a quaternary ammonium salt and an organic substance having an N-thiotrichloromethyl radical in which the nitrogen is linked to an acyl radical, alone and in combination, when employed against the organism *Candida albicans*, Strain No. 582, was determined by the following streak dilution method:

The test organism, which had been grown on glucose tryptone agar and incubated at 32° C. for 48 hours, was suspended in distilled sterile water to give a 28 percent light transmission on an Evelyn colorimeter employing a filter of 660 millimicrons. The test materials were diluted to various concentrations with sterile distilled water and thoroughly mixed with sterile melted glucose tryptone agar which had been adjusted to a pH of 4.5 and which contained 2.5 percent by weight of agar, the agar at the time of mixing being at a temperature of approximately 45° C. After mixing, the agar was allowed to solidify, streaked with the suspension of the test organism, incubated 72 hours at 32° C. and examined for growth. The highest dilution at which the organism failed to grow was taken as the end point of activity.

The results of the tests are given in the table below in which the values represent the end point of activity expressed as the volume of the dilution in cubic centimeters which would contain one gram of the compound.

| Quaternary Ammonium Salt | Compound having an >NSCCl₃ radical in which the nitrogen is linked to an acyl radical |
|---|---|
| BTC: | 3 - Thiotrichloromethyl - 5 - (1-ethyl)amylhydantoin: |
| 3,000 | 0 |
| 33,000 | 2,000,000 |
| 60,000 | 1,000,000 |
| 0 | 500,000 |
| Cetyl - beta - hydroxyethyl morpholineum chloride: | 3 - Thiotrichloromethyl - 5 - (1-ethyl)amylhydantoin: |
| 2,000 | 0 |
| 2,000 | 10,000,000 |
| 60,000 | 3,000,000 |
| 200,000 | 1,000,000 |
| 0 | 300,000 |
| N-cetylpiperidine methiodide: | 3 - Thiotrichloromethyl - 5 - (1-ethyl)amylhydantoin: |
| 30,000 | 0 |
| 90,000 | 10,000,000 |
| 100,000 | 3,000,000 |
| 100,000 | 1,000,000 |
| 0 | 300,000 |
| Cetyltrimethyl ammonium bromide: | 3 - Thiotrichloromethyl - 5 - (1-ethyl)amylhydantoin: |
| 3,000 | 0 |
| 9,000 | 10,000,000 |
| 100,000 | 3,000,000 |
| 215,000 | 1,000,000 |
| 0 | 300,000 |
| BTC: | N-Thiotrichloromethyl tetrahydrophthalimide: |
| 3,000 | 0 |
| 17,000 | 10,000,000 |
| 30,000 | 5,300,000 |
| 100,000 | 3,000,000 |
| 0 | 300,000 |
| BTC: | 3 - Thiotrichloromethyl - 5 - methyl - 5 - (3 - methylbuten - 2-yl)hydantoin: |
| 3,000 | 0 |
| 10,000 | 2,000,000 |
| 73,000 | 600,000 |
| 100,000 | 470,000 |
| 0 | 60,000 |
| BTC: | N-Thiotrichloromethyl succinimide: |
| 3,000 | 0 |
| 100,000 | 500,000 |
| 0 | 150,000 |
| BTC: | N - Thiotrichloromethyl - 5 - methyl - 5 - phenyl - oxazolidine-2,4-dione: |
| 3,000 | 0 |
| 3,000 | 500,000 |
| 30,000 | 150,000 |
| 0 | 50,000 |
| BTC: | N - Thiotrichloromethyl - 3,6 - endomethylene tetrahydrophthalimide: |
| 3,000 | 0 |
| 100,000 | 2,000,000 |
| 0 | 600,000 |
| BTC: | 3 - Thiotrichloromethyl - 5 - methyl-5-ethyl hydantoin: |
| 3,000 | 0 |
| 30,000 | 500,000 |
| 100,000 | 150,000 |
| 100,000 | 50,000 |
| 0 | 15,000 |
| BTC: | 1 - Nitro - 3 - thiotrichloromethyl-5,5-dimethyl hydantoin: |
| 3,000 | 0 |
| 3,000 | 500,000 |
| 23,000 | 150,000 |
| 100,000 | 50,000 |
| 0 | 27,000 |
| BTC: | 1 - Butyryl - 3 - thiotrichloromethyl-5,5-diphenyl hydantoin: |
| 3,000 | 0 |
| 8,000 | 500,000 |
| 10,000 | 380,000 |
| 30,000 | 150,000 |
| 0 | 38,000 |
| BTC: | 1-Acetyl-3-thiotrichloromethyl-5,5-dimethyl hydantoin: |
| 3,000 | 0 |
| 8,000 | 2,000,000 |
| 10,000 | 500,000 |
| 30,000 | 600,000 |
| 100,000 | 200,000 |
| 0 | 60,000 |
| BTC: | 1 - Acetyl - 3 - thiotrichloromethyl - 5 - methyl - 5 - carboxymethyl hydantoin: |
| 3,000 | 0 |
| 10,000 | 2,000,000 |
| 30,000 | 600,000 |
| 100,000 | 60,000 |
| 0 | 500,000 |

A particular advantage of the combination of the present invention resides in the adaptability of the ingredients to admixture with a variety of pharmaceutical carriers such as gels, creams, lotions, suspensions, tablets and powders whereby a stable, uniform suspension of the ingredients is provided which enables a more lasting, more penetrating, and more uniform distribution of the ingredients on the skin to be achieved.

In order to further illustrate the invention and in particular to illustrate the form of the invention in which the ingredients are in admixture with a variety of pharmaceutical carriers, the following specific examples of the manufacture of effective and suitable compositions embodying the combination of ingredients are presented.

*Example II*

905 cc. of water was heated to 70° C. and a mixture of 50 gm. of glycerol and 30 gm. of sodium carboxymethyl cellulose was added. The resulting mixture was stirred until uniform in texture and then cooled to 50° C. 10 grams of 3-thiotrichloromethyl-5-(1-ethyl)amyl-hydantoin and 5 gm. of BTC were successively added to the mixture at 50° C. and the resulting gel was allowed to cool to room temperature.

*Example III*

Fifty grams of lanolin, 20 grams of cetyl alcohol and 120 grams of glycerol monostearate were mixed and heated to 75° C. and added to a solution prepared by dissolving $5/10$ gram of BTC, 10 grams of 3-thiotrichloromethyl-5-(1-ethyl)amyl-hydantoin and 50 grams of glycerol in 740.5 cc. of water, the latter solution being at a temperature of 75° C. After mixing the two solutions at 75° C., the resulting cream was allowed to cool to room temperature.

*Example IV*

10 grams of cetyl alcohol, 20 grams of polyethylene glycol having an approximate molecular weight of 4000, and 50 grams of stearic acid were melted together and heated to 70° C. The resulting mixture was added to an aqueous solution prepared by adding 0.5 gram of BTC, 10 grams of 3-thiotrichloromethyl-5-(1-ethyl)amyl-hydantoin, 30 grams of glycerol and 0.5 gram of triethanol amine to 779 cc. of water, the aqueous solution being at a temperature of 70° C. The resulting lotion was thoroughly stirred and allowed to come to room temperature.

*Example V*

Two grams of methylcellulose, 10 grams of 3-thiotrichloromethyl-5-(1-ethyl)amyl-hydantoin and 0.5 gram of BTC were added to 987.5 cc. of water and the resulting lotion was mixed until uniform and then chilled to 10° C. and again stirred until the formulation was at room temperature.

*Example VI*

10 grams of gum acacia, 10 grams of 3-thiotrichloromethyl-5-(1-ethyl)amyl-hydantoin, 0.5 gram of BTC and 970.5 grams of lactose were mixed in dry form, moistened sufficiently with water to provide a crumbly mass, granulated through a ten mesh screen and dried at 50° C. The dried granulations were passed through a fourteen mesh screen and crushed into tablets.

*Example VII*

10 grams of 3-thiotrichloromethyl-5-(1-ethyl)amyl-hydantoin, 0.5 gram BTC and 980.5 grams of USP talc were combined and mixed for two hours in a powder mixer.

In the formulations illustrated in the above examples the quantities or concentrations of active ingredients may be changed within a reasonable range. Thus, in the exemplified compositions, the proportions of quaternary ammonium salt and a compound having an $>NSCCl_3$ radical, in which the nitrogen is linked to an acyl radical, may each be varied within the range of from 0.01 to 10 percent of the respective formulations by weight, the preferred range over which the two active ingredients may be varied being from 0.1 to 1.0 percent of the respective formulations by weight. Although the proportions of the active ingredients may be varied as indicated, it is preferred that the relative proportions of the two active ingredients be such that the quaternary ammonium salt is present in a minor proportion and the compound having $>NSCCl_3$ radical in which the nitrogen is linked to an acyl radical is present in a major proportion.

Ninety-eight patients having vulvovaginal candidiasis were treated with the formulation of Example II, five grams of the cream being applied daily for ten days to the infected area. After the course of treatment, symptoms of the infection were absent and the presence of pathogenic fungi of the genus Candida, and particularly *Candida albicans*, could not be demonstrated in the vulvovaginal area.

Thirty-three patients having *Candida albicans* infections, of which 10 were paronychial infections with nail involvement and 21 involved the intertriginous areas were treated with the lotion of Example V, the lotion being applied daily to the infected areas for fourteen days. After the course of treatment, there were no symptoms of the infection and the presence of *Candida albicans* could not be demonstrated in the areas treated.

Ten patients having oral thrush were treated with the lotion of Example V, the lotion being applied to the infected areas three times daily for fourteen days. After the course of treatment, symptoms of the infection were absent and the presence of *Candida albicans* could not be demonstrated in the area treated.

The use of N-thiotrichloromethylimides of dibasic acids is described and claimed in our copending application, Serial No. 773,138, filed November 12, 1958.

What is claimed is:

1. A fungicidal composition comprising in combination a non-toxic and non-irritating surface-active quaternary ammonium salt and a N-thiotrichloromethyl hydantoin of the formula

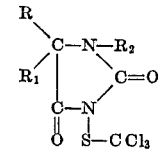

in which R and $R_1$ are each selected from the group consisting of hydrogen, phenyl radicals, and aliphatic radicals having not more than eight carbon atoms; and $R_2$ is selected from the group consisting of hydrogen, a nitro radical, and an acyl radical having not more than six carbon atoms; in the relative proportions by weight of one-hundredth percent quaternary ammonium salt: ten percent N-thiotrichloromethyl hydantoin to ten percent quaternary ammonium salt: one-hundredth percent N-thiotrichloromethyl hydantoin.

2. The composition of claim 1 dispersed in an aqueous gel.

3. The composition of claim 1 dispersed in a cream base.

4. The composition of claim 1 dispersed in an aqueous lotion.

5. The composition of claim 1 dispersed in an inert solid diluent.

6. The composition of claim 1 in which the hydantoin is 3-thiotrichloromethyl-5-(1-ethyl)amyl hydantoin.

7. The composition of claim 6 in dosage unit form in intimate admixture with an inert solid diluent.

8. The composition of claim 3 in which the hydantoin is 3-thiotrichloromethyl-5-methyl-5-(3-methylbuten-2-yl) hydantoin.

9. The composition of claim 4 in which the hydantoin is 3-thiotrichloromethyl-5-methyl-5-ethyl hydantoin.

10. The composition of claim 5 in which the hydantoin is 1-nitro-3-thiotrichloromethyl-5,5-dimethyl hydantoin.

11. The composition of claim 2 in which the hydantoin is 3-thiotrichloromethyl-5-(1-ethyl)amyl hydantoin.

References Cited in the file of this patent

UNITED STATES PATENTS

| | | |
|---|---|---|
| 2,553,770 | Kittleson | May 22, 1951 |
| 2,689,814 | Nicholls | Sept. 21, 1954 |

OTHER REFERENCES

Wadley: U.S. Dept. of Agr., "The Evidence Required to Show Synergistic Action of Insecticides and a Short Cut in Analysis," June 1945 (7 pp. brochure).

Ball: A.M.A. Arch. of Dermatology, vol. 71, No. 6, June 1955, pp. 696–698.

Unlisted Drugs, vol. 3, No. 8, August 31, 1951, p. 104; vol. 3, No. 12, December 31, 1951, p. 172; vol. 4, No. 8, August 3, 1952, pp. 115, 116; vol. 5, No. 1, January 31, 1953, p. 11.